United States Patent Office 2,810,720
Patented Oct. 22, 1957

2,810,720
QUATERNARY AMMONIUM COMPOUNDS

Earl W. Lane, Philadelphia, Pa., assignor to Rohm & Haas Company, Philadelphia, Pa., a corporation of Delaware No Drawing. Application July 19, 1955,
Serial No. 523,105

12 Claims. (Cl. 260—247.7)

This invention relates to dialkyldodecenyloctyloxypentenyl ammonium halides as new compositions of matter. It further relates to methods of preparation of these compositions.

The compounds of the present invention may be represented by the formula

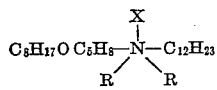

in which X is preferably chlorine, bromine, or iodine, that is, a halogen having an atomic weight of about 35.5 to 127, and the R's, individually, represent methyl or ethyl groups and, collectively, represent a saturated divalent aliphatic chain of four to five atoms which jointly with the nitrogen forms a five- to six-sided heterocyclic amine group.

The symbol X has been defined as preferably chlorine, bromine, or iodine. Chlorine is the preferred representation of X. It will be apparent to one skilled in the art that other anions may be employed such as sulfate, methylsulfate, phosphate, acetate, and the like, which may be supplied directly or by metathesis with the halide form of the present compounds.

The R's, taken singly, may represent an alkyl group of no more than two carbon atoms, that is, a methyl or ethyl group in which case the R's may be the same or different. The R's considered collectively and in conjunction with the amino nitrogen may stand for a morpholino, thiamorpholino, pyrrolidinyl, or piperidino group, and these groups having an alkyl substituent, such as a methyl group.

The dodecenyl group may be a straight or branched chain in any of the known configurations, including n-dodecenyl, isododecenyl, dimethyldecenyl, ethyldecenyl, trimethylnonenyl, tetramethyloctenyl, and the like. A common commercial form of the dodecenyl group is tetramethyloctenyl, in which there are two methyl groups on each of the number 5 and 7 carbons and the double bond is at the number 2 location. Similarly, the octyl group may be employed in any of the known spatial arrangements such as n-octyl, isooctyl, methylheptyl, ethylhexyl, dimethylhexyl, methylethylpentyl, and the like. Also, the pentenyl group is the normal straight chain arrangement.

The present compounds may be prepared preferably in one of two ways. In one case, octyloxypentenyl halide is reacted with dodecenyldialkylamine. Alternatively, the present compounds may be prepared by reacting dodecenyl halide with octyloxypentenyldialkylamine.

The reactants, set forth above, used for the preparation of the instant compounds are known or prepared by known methods. Illustrative methods of preparing typical reactants that may be employed to prepare the quaternary ammonium compounds of this invention are shown in the following preparations in which parts by weight are used throughout.

PREPARATION A

There are added to a reaction vessel 381.6 parts of n-octyl alcohol and 83.6 parts of paraformaldehyde. There are introduced over a period of two and a half hours a total of 104.5 parts of hydrogen chloride while the temperature of the reaction mixture is maintained at −10° to 10° C. The mixture is allowed to stand and form layers. The organic layer is separated from aqueous layer and dried over anhydrous magnesium sulfate. The anhydrous organic layer is identified as n-octyloxymethyl chloride.

There is added to a reaction vessel 542.1 parts of n-octyloxymethyl chloride and 31.7 parts of anhydrous zinc chloride. There is slowly added butadiene while the temperature of the reaction mixture is maintained at 10° to 21° C. A total of 160 parts of butadiene is added over a period of two and a half hours. The reaction mixture is then washed once with water, twice with aqueous 10% sodium carbonate, and once more with water. The product is dried over anhydrous magnesium sulfate and distilled at 110° to 125° C. at 2.3 mm. of pressure. The product has a chlorine content of 15.3% (15.2% theoretical) and corresponds to n-octyloxypentenyl chloride. There are also employed as above and with similar results the other isomeric forms of octyl alcohol, such as 1-methylheptanol, 6-methylheptanol, 2-ethylhexanol, 1,4-dimethylhexanol, 2-methyl-4-ethylpentanol, 1-methyl-3-heptanol, 2-ethyl-4-hexanol, 1,3-dimethylhexanol, and 2,2-4-trimethylpentanol.

PREPARATION B

There are introduced into a reaction vessel 46.4 parts of n-octyloxypentenyl chloride, 8 parts of sodium hydroxide, and 300 parts of aqueous 25% dimethylamine. The reaction mixture is heated at 70° to 85° C. for four hours. There is added to the cooled reaction mixture 150 parts of toluene. The toluene layer is separated, washed with water, and distilled at 110° to 120° C. at 1 mm. of pressure. The distillate is collected and identified as n-octyloxypentenyldimethylamine. Similarly, as in Preparation A, the other isomeric forms of the octyl group are satisfactorily employed.

PREPARATION C

A mixture of 16 parts of zinc chloride, 21.8 parts of butadiene, and 60 parts of t-octyl chloride is charged to a water cooled autoclave and agitated at 30° C. for 72 hours. The reaction mixture is washed with water, aqueous 10% sodium carbonate, and once again with water. The product may be purified by distillation under reduced pressure to yield a product that corresponds to t-dodecenyl chloride. This method is suitable for compounds having a tertiary carbon atom attached directly to a halide bearing carbon atom. The corresponding compounds containing a primary or secondary carbon atom attached to the halide bearing carbon atom may be readily prepared such as by reacting a selected alcohol with concentrated hydrochloric acid by known methods. There can thereby be prepared isooctyl, methylheptyl, ethylhexyl, dimethylhexyl, and methylethylpentyl chlorides having the spatial arrangements indicated in Preparation A.

PREPARATION D

There are added to a reaction vessel 40.5 parts of n-dodecenyl chloride, 300 parts of aqueous 25% dimethylamine, and 8 parts of sodium hydroxide. The reaction mixture is heated for five hours at 72° to 88° C. The mixture is allowed to cool and then 150 parts of toluene is added. The toluene layer is separated, washed with water, and distilled under reduced pressure. The distillate is collected and identified as n-dodecyldimethylamine.

There are employed in a like and satisfactory manner the other isomeric form of dodecenyl chloride such as 1-chloro-3-methyl-2-undecene, 1-chloro-3,4-dimethyl-2-decene, 2-chloro-3,3,4-trimethyl-6-nonene, and 1-chloro-5,5,7,7-tetramethyl-2-octene.

Typical of the reactants that may be employed when an octyloxypentenyl halide is reacted with a dodecenyldialkylamine include octyloxypentenyl chloride, octyloxypentenyl bromide, octyloxypentenyl iodide, dodecenyldimethylamine, dodecenyldiethylamine, dodecenylmethylethylamine, dodecenylmorpholine, dodecenylpiperidine, dodecenylpyrrolidine, and dodecenylthiamorpholine. When a dodecenyl halide is reacted with an octyloxypentenyldialkylamine typical reactants include dodecenyl chloride, dodecenyl bromide, dodecenyl iodide, octyloxypentenyldimethylamine, octyloxypentenyldiethylamine, octyloxypentenylmethylethylamine, octyloxypentenylmorpholine, octyloxypentenylthiamorpholine, octyloxypentenylpyrrolidine, and octyloxypentenylpiperidine.

As previously stated, the present compounds may be prepared by two methods. Both methods are satisfactory and the choice of either is largely a matter of convenience. Both methods are conducted under essentially the same conditions to produce substantially quantitative results.

The present reactions are preferably conducted in the presence of a volatile inert organic solvent such as acetonitrile, dimethylformamide, nitromethane, toluene, xylene, benzene, isopropanol, butanol, isopropyl ether, and the like, and mixtures thereof. Reaction temperatures in the range of about 50° to 150° C. are employed with about 60° to 125° C. preferred. It is frequently advantageous to employ the reflux temperature of the reaction mixture when solvents are employed. Reaction times of two to twenty-four hours are used depending largely on the reaction temperature, solvent, and reactants employed. Completeness of reaction can be determined by the amount of ionizable halide formed in the reaction mixture. At the conclusion of the reaction the mixture is preferably washed with heptane, or the like to remove any unreacted starting materials. The product is then isolated preferably by stripping off the volatile components under reduced pressure or on a steam bath.

The quaternary ammonium compounds of this invention are generally white to gray waxy or solid materials that are especially valuable as bactericides particularly when used against *Salmonella typhosa* and *Micrococcus pyogenes* var. *aureus*. For instance, the quaternary ammonium compound octyloxypentenyldodecenyldimethylammonium chloride, which may be structurally represented as

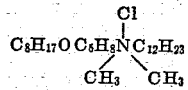

in which the octyl and pentenyl groups have a straight chain configuration and the dodecenyl group is in its tetramethyloctenyl isomeric form wherein there are two methyl groups on each of the number 5 and 7 carbon atoms and the double bond is in the number 2 location, in a standard phenol coefficient test gave a value of 390 against *Salmonella typhosa* and greater than 1500 against *Micrococcus pyogenes*. Similar results are obtained with the other compounds of this invention.

The quaternary ammonium compounds of this invention and the methods for their preparation may be more fully understood from the following examples which are offered by way of illustration and not by way of limitation. Parts by weight are used throughout.

*Example 1*

There are added to a reaction vessel 30 parts of n-octyloxypentenyl chloride, 23.4 parts of n-dodecenyldimethylamine, and 50 parts of benzene denatured ethanol. The mixture is heated at 70° to 78° C. for twenty-one hours. The mixture is allowed to cool and then 150 parts of water is added. The mixture is washed twice with heptane and then stripped of volatile components leaving the product as the solid residue. The product is identified as octyloxypentenyldodecenyldimethylammonium chloride. The product may also be named N,N-dimethyl-N-dodecenyl-N-octyloxypentenylammonium chloride.

The corresponding bromide and iodide compounds are made by employing n-octyloxypentenyl bromide and n-octyloxypentenyl iodide respectively, instead of n-octyloxypentenyl chloride.

There are prepared in a similar way and with similar results the compounds containing the various isomeric forms of the octyl and dodecenyl groups as described heretofore and as shown in the Preparations A and D.

*Example 2*

A mixture of 24.7 parts of dodecenyl bromide, 26.9 parts of octyloxypentenyldiethylamine, and 150 parts of acetonitrile is added to a reaction vessel. The reaction mixture is heated for twelve hours at 76° to 82° C. The mixture is cooled and then washed twice with heptane. The acetonitrile is removed by stripping leaving the product as the residue. The product is identified as octyloxypentenyldodecenyldiethylammonium bromide.

The corresponding chloride and iodide compounds are prepared by employing dodecenyl chloride and dodecenyl iodide, respectively, in place of the dodecenyl bromide.

The above compounds are satisfactorily prepared by using any of the isomeric forms of the octyl and dodecenyl groups, as previously discussed and as shown in the Preparations B and C.

*Example 3*

There are added to a reaction vessel 25.3 parts of dodecenylmorpholine, 20.8 parts of octyloxypentenyl chloride, and 150 parts of isopropanol. The mixture is heated for sixteen hours at 80° to 82° C. and then allowed to cool. The mixture is washed twice with heptane. The isopropanol is removed by stripping under reduced pressure leaving the product as the residue. The product corresponds to octyloxypentenyldodecenylmorpholinium chloride.

In a similar manner there may be prepared octyloxypentenyldodecenylpiperidinium bromide by using as reactants octyloxypentenyl bromide and dodecenylpiperidine.

The foregoing compounds are satisfactorily made by employing any of the isomeric forms of the octyl and dodecenyl groups as described previously and shown in Preparations A and D.

*Example 4*

A mixture of 20.3 parts of dodecenyl chloride, 25.5 parts of octyloxypentenylmethylethylamine, and 125 parts of dimethylformamide is heated in a reaction vessel at 110° to 118° C. for ten hours. The mixture is stripped under reduced pressure, to remove the dimethylformamide, leaving the product as the residue. The product corresponds to octyloxypentenyldodecenylmethylethylammonium chloride.

In like manner there is prepared octyloxypentenyldodecenylpyrrolidinium chloride by reacting octyloxypentenyl chloride with dodecenylpyrrolidine.

The above compounds are satisfactorily prepared by using the various isomeric forms of the octyl and dodecenyl groups as discussed heretofore and shown in Preparations A to D, inclusive.

The quaternary ammonium compounds of this invention are excellent bactericides. In standard phenol coefficient evaluations the present compounds in their various isomeric forms produce values in the range of about 250 to 400 and above against *Salmonella typhosa*. The instant compounds are especially effective against *Micro-*

*coccus pyrogenes* frequently giving phenol coefficient values above 1000 and in many cases even above 1500. They also exhibit fungistatic and fungicidal activity. Furthermore, these quaternary ammonium compounds are surface-active and cation-active wetting agents and emulsifiers.

I claim:

1. A method for the preparation of a quaternary ammonium compound having the formula

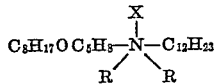

which comprises heating in the temperature range of about 50° to 150° C. and thereby causing to react substantially in equimolecular proportions a compound having the formula $C_{12}H_{23}X$ with one having the formula $C_8H_{17}OC_5H_8NRR$, in which said $C_{12}H_{23}$— and said —$C_5H_8$— groups are aliphatic in structure, said R groups taken separately are alkyl groups of one to two carbon atoms and taken together with the nitrogen atom form a heterocyclic group selected from the group consisting of morpholino, piperidino, and pyrrolidinyl, and X is a member from the group consisting of chloride, bromide, iodide, methylsulfate, acetate, and equivalents of sulfate and phosphate.

2. A method for the preparation of a quaternary ammonium compound having the formula

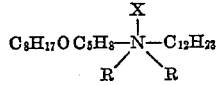

which comprises heating in the presence of a volatile inert organic solvent in the temperature range of about 50° C. to the reflux temperature of the reaction mixture and thereby causing to react substantially in equimolecular proportions a compound having the formula $C_{12}H_{23}X$ with one having the formula $C_8H_{17}OC_5H_8NRR$, in which said $C_{12}H_{23}$— and said —$C_5H_8$— groups are aliphatic in structure, said R groups taken separately are alkyl groups of one to two carbon atoms and taken together with the nitrogen atom form a heterocyclic group selected from the group consisting of morpholino, piperidino, and pyrrolidinyl, and X is a member from the group consisting of chloride, bromide, iodide, methylsulfate, acetate and equivalents of sulfate and phosphate.

3. A method for the preparation of the quaternary ammonium compound having the formula

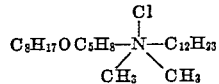

said —$C_5H_8$— and $C_{12}H_{23}$— groups being aliphatic in structure, which comprises reacting in substantially equimolecular proportions, in the temperature range of about 60° to 125° C. and in the presence of a volatile inert organic solvent, octyloxypentenyl chloride with dodecenyldimethylamine.

4. A method for the preparation of the quaternary ammonium compound having the formula

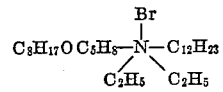

said —$C_5H_8$— and $C_{12}H_{23}$— groups being aliphatic in structure, which comprises reacting in substantially equimolecular proportions, in the temperature range of about 60° to 125° C. and in the presence of a volatile inert organic solvent, octyloxypentenyl bromide with dodecenyldiethylamine.

5. A method for the preparation of the quaternary ammonium compound having the formula

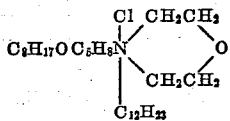

said —$C_5H_8$— and $C_{12}H_{23}$— groups being aliphatic in structure, which comprises reacting in substantially equimolecular proportions, in the temperature range of about 60° to 125° C. and in the presence of a volatile inert organic solvent, octyloxypentenyl chloride with dodecenylmorpholine.

6. A method for the preparation of the quaternary ammonium compound having the formula

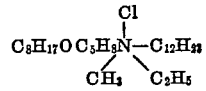

said —$C_5H_8$— and $C_{12}H_{23}$— groups being aliphatic in structure, which comprises reacting in substantially equimolecular proportions, in the temperature range of about 60° to 125° C. and in the presence of a volatile inert organic solvent, octyloxypentenylmethylethylamine with dodecenyl chloride.

7. As a new composition of matter the quaternary ammonium compound having the formula

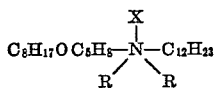

in which said $C_{12}H_{23}$— and said $C_5H_8$— groups are aliphatic in structure, said R groups taken separately are alkyl groups of one to two carbon atoms and taken together with the nitrogen atom form a heterocyclic group selected from the group consisting of morpholino, piperidino, and pyrrolidinyl, and X is a member from the group consisting of chloride, bromide, iodide, methylsulfate, acetate, and equivalents of sulfate and phosphate.

8. As a new composition of matter the quaternary ammonium compound having the formula

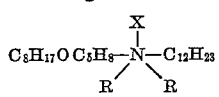

in which said $C_{12}H_{23}$— and said —$C_5H_8$— groups are aliphatic in structure, R represents an alkyl group of one to two carbon atoms, and X is a halogen atom having an atomic weight of about 35.5 to 127.

9. As a new composition of matter the quaternary ammonium compound having the formula

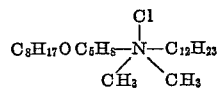

said —$C_5H_8$— and $C_{12}H_{23}$— groups being aliphatic in structure.

10. As a new composition of matter the quaternary ammonium compound having the formula

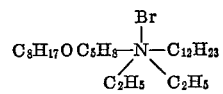

said —$C_5H_8$— and $C_{12}H_{23}$— groups being aliphatic in structure.

11. As a new composition of matter the quaternary ammonium compound having the formula

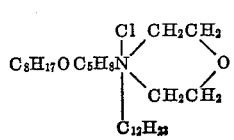

said —C$_5$H$_8$— and C$_{12}$H$_{23}$— groups being aliphatic in structure.
12. As a new composition of matter the quaternary ammonium compound having the formula
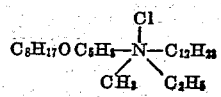
said —C$_5$H$_8$— and C$_{12}$H$_{23}$— groups being aliphatic in structure.
References Cited in the file of this patent
UNITED STATES PATENTS
2,087,132   Taub et al. _____ July 13, 1937